United States Patent
Mori et al.

(10) Patent No.: US 8,097,357 B2
(45) Date of Patent: Jan. 17, 2012

(54) BATTERY CAN AND METHOD FOR MANUFACTURING THE SAME

(75) Inventors: Katsuhiko Mori, Osaka (JP); Kouhei Kitagawa, Hyogo (JP); Masatoshi Hano, Osaka (JP); Toru Morimoto, Nara (JP); Hideo Omura, Yamaguchi (JP); Tatsuo Tomomori, Yamaguchi (JP); Masao Suda, Yamaguchi (JP); Hitoshi Omura, Yamaguchi (JP)

(73) Assignees: Panasonic Corporation, Osaka (JP); Toyo Kohan Co., Ltd., Tokyo (JP)

( * ) Notice: Subject to any disclaimer, the term of this patent is extended or adjusted under 35 U.S.C. 154(b) by 1140 days.

(21) Appl. No.: 11/887,788

(22) PCT Filed: Jun. 20, 2006

(86) PCT No.: PCT/JP2006/312336
§ 371 (c)(1), (2), (4) Date: Oct. 3, 2007

(87) PCT Pub. No.: WO2006/137403
PCT Pub. Date: Dec. 28, 2006

(65) Prior Publication Data
US 2009/0269661 A1    Oct. 29, 2009

(30) Foreign Application Priority Data
Jun. 22, 2005 (JP) .................. 2005-182351

(51) Int. Cl.
*H01M 2/02* (2006.01)
*H01M 6/08* (2006.01)
*C23C 8/00* (2006.01)
*C23C 22/00* (2006.01)
*C23C 8/80* (2006.01)

(52) U.S. Cl. ......... 429/164; 429/166; 148/217; 148/277

(58) Field of Classification Search .................. 429/164, 429/166; 148/217, 277
See application file for complete search history.

(56) References Cited

U.S. PATENT DOCUMENTS
5,576,113 A    11/1996    Hirofumi et al.
(Continued)

FOREIGN PATENT DOCUMENTS
| EP | 1 498 963 A | 1/2005 |
| JP | 3-216952 | 9/1991 |
| JP | 6-346150 | 12/1994 |

(Continued)

OTHER PUBLICATIONS
European Search Report issued in European Patent Application No. EP 06766997 dated Nov. 25, 2008.

*Primary Examiner* — Gregg Cantelmo
*Assistant Examiner* — Eugenia Wang
(74) *Attorney, Agent, or Firm* — McDermott Will & Emery LLP

(57) ABSTRACT

A battery can of the present invention ensures a stable and favorable contact with an electrode and thus makes it possible to obtain a highly reliable battery excellent in high rate discharge characteristics. The battery can having an opening, including a cylindrical side portion and a bottom portion, of the present invention is formed from a steel plate. The steel plate has an Ni—Fe alloy layer on the inner face side of the battery can. The Ni—Fe alloy layer has an oxide layer containing iron and having a thickness of 10 to 50 nm on the inner face side of the battery can.

6 Claims, 7 Drawing Sheets

U.S. PATENT DOCUMENTS

| | | | |
|---|---|---|---|
| 5,603,782 A | | 2/1997 | Sugikawa et al. |
| 5,840,441 A | | 11/1998 | Hirofumi et al. |
| 5,993,994 A | | 11/1999 | Ohmura et al. |
| 2004/0238073 A1 | * | 12/2004 | Ishii et al. .................... 148/217 |
| 2006/0083981 A1 | | 4/2006 | Mori et al. |

FOREIGN PATENT DOCUMENTS

| | | |
|---|---|---|
| JP | 8-55613 | 2/1996 |
| JP | 2002-208382 | 7/2002 |
| JP | 2002-212776 | 7/2002 |
| WO | WO 2005/022670 A1 * | 3/2005 |

* cited by examiner

BATTERY CAN AND METHOD FOR MANUFACTURING THE SAME

RELATED APPLICATIONS

This application is the U.S. National Phase under 35 U.S.C. §371 of International Application No. PCT/JP2006/312336, filed on Jun. 20, 2006, which in turn claims the benefit of Japanese Application No. 2005-182351, filed on Jun. 22, 2005, the disclosures of which Applications are incorporated by reference herein.

TECHNICAL FIELD

The present invention relates to a battery can with high quality to be used as an outer case for manganese batteries, alkaline manganese batteries, nickel-cadmium storage batteries, nickel-hydrogen storage batteries, non-aqueous electrolyte secondary batteries represented by lithium ion batteries, and the like, and a method for manufacturing the same with high productivity and at low cost.

BACKGROUND ART

With recent development of portable equipment, an increasing number of batteries have been used and the reduction in price of primary batteries as well as secondary batteries has been strongly required by the market.

One proposal suggests a DI (drawing and ironing) method be used as a method for manufacturing a battery can in order to increase the productivity of the battery can and reduce the price thereof (for example, see Patent Document 1). In the DI method, a cup-shaped intermediate product is fabricated by means of deep-drawing with a press machine, and then the cup-shaped intermediate product is subjected to ironing and drawing in one continuous stroke, whereby a battery can having a predetermined shape is fabricated. In other words, in the DI method, both drawing and ironing are performed in a single step.

An example of the method of manufacturing a battery can employing the DI method will be hereinafter described.

First, a 0.4 mm thick steel plate is prepared as a base material and the steel plate is heated at 600 to 800° C. for 5 to 20 hours. Subsequently, an Ni-plated layer having a thickness of approximately 3.5 μm is formed on both faces of the steel plate after heat treatment, and then the steel plate with Ni-plated layers is heated at 500 to 650° C. for 1 to 20 hours, thereby to obtain a battery can base material. On each surface of the battery can base material thus obtained, a nickel-iron alloy layer (Ni—Fe alloy layer) is formed. Further, on each of the alloy layers, a nickel layer (Ni layer) is further formed. The Ni—Fe alloy layer is produced mainly by heat treatment that allows Ni atoms to be dispersed into the Fe layer.

The battery can base material is subjected to deep-drawing to be formed into a cup-shaped intermediate product, and then the side portion of the cup-shaped intermediate product is subjected to ironing so that the ratio of the thickness of the bottom portion to the thickness of the side portion (the thickness of the bottom portion/the thickness of the side portion) falls within a range of 1.2 to 3.4, whereby a battery can with a predetermined shape is produced.

In order to preferably perform the DI method, it is necessary to obtain a battery can base material that is free of warpage and uniform in quality. For this purpose, a long-time heat treatment as described above must be performed. In many cases, a box annealing furnace is used for a long-time heat treatment. For example, hoop-shaped steel plate is housed in the box annealing furnace, in which heat treatment is carried out.

As another measure for increasing the productivity of a battery can and reducing the price thereof, there has been another proposal suggested with a focus on the step of heat treatment on a steel plate as a battery can base material (for example, see Patent Document 2). According to this proposal, the use of an ultra-low carbon steel plate having a carbon content of less than 0.009 wt % makes it possible to perform continuous annealing. As a result, the time required for heat treatment is drastically shortened and the productivity of the battery can is improved.

The formation of the Ni-layer on the surface of the inner side of the battery can as descried above makes it possible to obtain an improved corrosion resistance of the battery can.

Moreover, with expansion of application range of batteries and increase in the consumption current of portable equipment, improvement in the high rate discharge characteristics has been increasingly required. In addition, with respect to secondary batteries, improvement in the rapid charge characteristics has been required.

As a measure for improving the rapid charge and discharge characteristics, yet another proposal suggests a nickel-plated steel plate for alkaline manganese batteries, the steel plate being provided with an Ni—Fe alloy layer having an iron exposure rate at the outermost surface of not less than 10% (for example, see Patent Document 3).

In the case where a battery can having an Ni layer on the inner face thereof as suggested in Patent Documents 1 and 2 is used, however, the nickel atoms in the Ni-layer become bonded with oxygen atoms with the passage of time, and a nickel oxide layer extremely low in electrical conductivity is consequently formed. As a result, the internal resistance of the battery is readily increased.

The inner face of the battery can also serving as a terminal of either one electrode of a positive electrode and a negative electrode is normally in contact with the electrode accommodated in the battery can, whereby the battery can and the electrode are electrically connected. Since the battery can and the electrode is in contact via the nickel oxide layer extremely low in electrical conductivity, the internal resistance of the battery is increased.

The battery can formed from the nickel plated steel plate of Patent Document 3 also has a disadvantage in that the rapid charge and discharge characteristics, especially the high rate discharge characteristics, does not sufficiently satisfy a required performance, and needs further improvement. Furthermore, even if the iron exposure rate on the surface of the Ni—Fe alloy layer is not less than 10%, the condition of the inner face of the battery can is easily varied because the nickel or iron on the surface is partially oxidized as the passage of time.

Patent Document 1: Japanese Patent Laid-Open Publication No. Hei 8-55613
Patent Document 2: Japanese Patent Laid-Open Publication No. Hei 6-346150
Patent Document 3: Japanese Patent Laid-Open Publication No. 2002-208382

DISCLOSURE OF THE INVENTION

Problems to be Solved by the Invention

The present invention therefore intends to solve the conventional problems as described above, and to provide a battery can that ensures a stable and favorable contact with an electrode and thus making it possible to obtain a battery excellent in high rate discharge characteristics.

Means for Solving the Problems

A battery can of the present invention is a battery can having an opening, comprising a cylindrical side portion and a bottom portion, and the battery can is formed of a steel plate. The steel plate has an Ni—Fe alloy layer on the inner face side of the battery can. The Ni—Fe alloy layer has an oxide layer containing iron and having a thickness of 10 to 50 nm on the inner face side of the battery can.

As such, it is possible to obtain a battery excellent in high rate discharge characteristics, by providing the battery can that ensures a stable and favorable contact with an electrode.

It is preferable that the oxide layer contains 3 to 50 atm % of iron in the outermost surface thereof.

It is preferable that the thickness of the oxide layer is a depth from the outermost surface of the oxide layer to the point where an oxygen concentration reaches less than 5 atm % in element analysis in the direction of depth by X-ray photoelectron spectroscopy.

It is preferable that the surface roughness (Ra) of the inner face of the side portion is not more than 1 μm.

It is preferable that the battery can has an Ni-layer having a thickness of not less than 0.5 μm on the outer face side thereof.

It is preferable that the steel plate contains 0.10 to 0.45 wt % of manganese and 0.005 to 0.05 wt % of phosphorus.

A method for manufacturing a battery can of the present invention comprises (1) a first step of providing a nickel plating at least on one face of a steel plate to give a steel plate having a nickel layer; (2) a second step of heating the steel plate with a nickel layer under an inert atmosphere or a reducing atmosphere to form a steel plate having an Ni—Fe alloy layer having a thickness of 2.25 times as much as that of the nickel layer; (3) a third step of forming an oxide layer containing iron on the surface of the Ni—Fe alloy layer; and (4) a fourth step of forming a battery can having an opening, comprising a cylindrical side portion and a bottom portion from the steel plate so that the face on which the oxide layer is formed faces the inside and the thickness of the oxide layer is 10 to 50 nm.

It is preferable that in the third step, the steel plate having an Ni—Fe alloy layer is subjected to continuous annealing under an atmosphere of a temperature of 80 to 450° C. and a dew point of 5 to 15° C. to form the oxide layer.

It is preferable that in the second step, the steel plate having a nickel layer is heated at 750 to 850° C. for 60 to 180 seconds.

Effect of the Invention

The present invention can provide a battery can that ensures a stable and favorable contact with an electrode and thus makes it possible to obtain a highly reliable battery excellent in high rate discharge characteristics.

Figure 1:
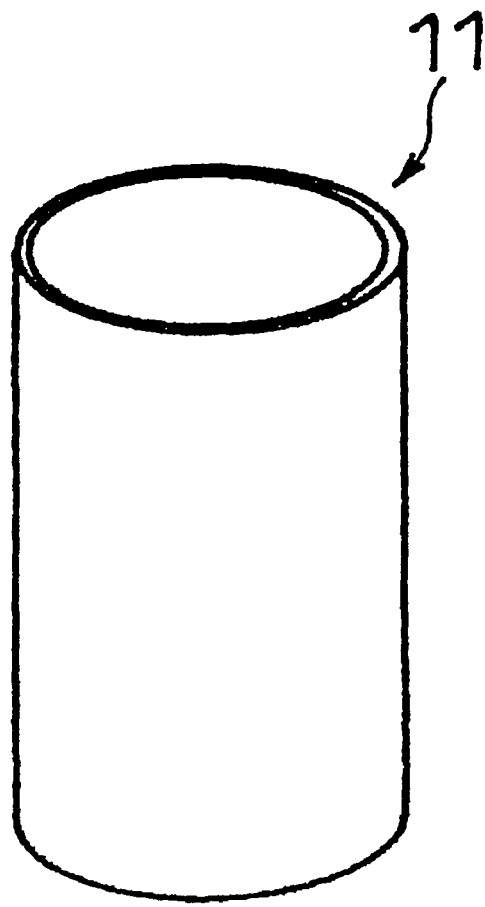
FIG. 1 An oblique view of a battery can with one end open and the other end closed having a circular cross section.

In Figures, the reference numeral 1 denotes a battery can, 2 denotes a positive electrode material mixture, 3 denotes a gelled negative electrode, 4 denotes a separator, 5 denotes a sealing body, 6 denotes a negative electrode current collector, 7 denotes a bottom plate, 8 denotes an outer label, 11, 12, 13 and 14 denote a battery can with one end open and the other end closed, 20 denotes a cylindrical battery can, 21 denotes a steel plate, 22 denotes an Ni—Fe alloy layer and 23 denotes an oxide layer.

BEST MODE FOR CARRYING OUT THE INVENTION

The present invention will be hereinafter described with reference to the drawings.

Figure 2:
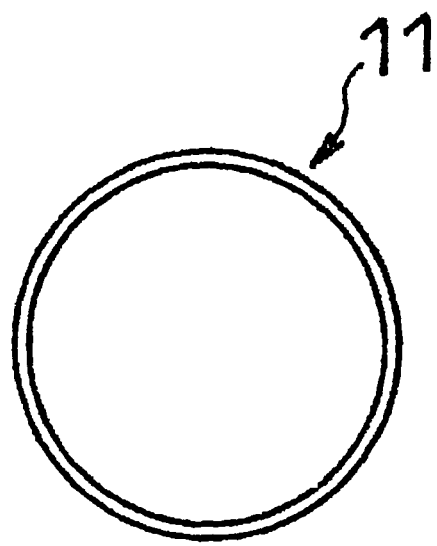
FIG. 2 A top view of the battery can with one end open and the other end closed having a circular cross section.
Figure 3:
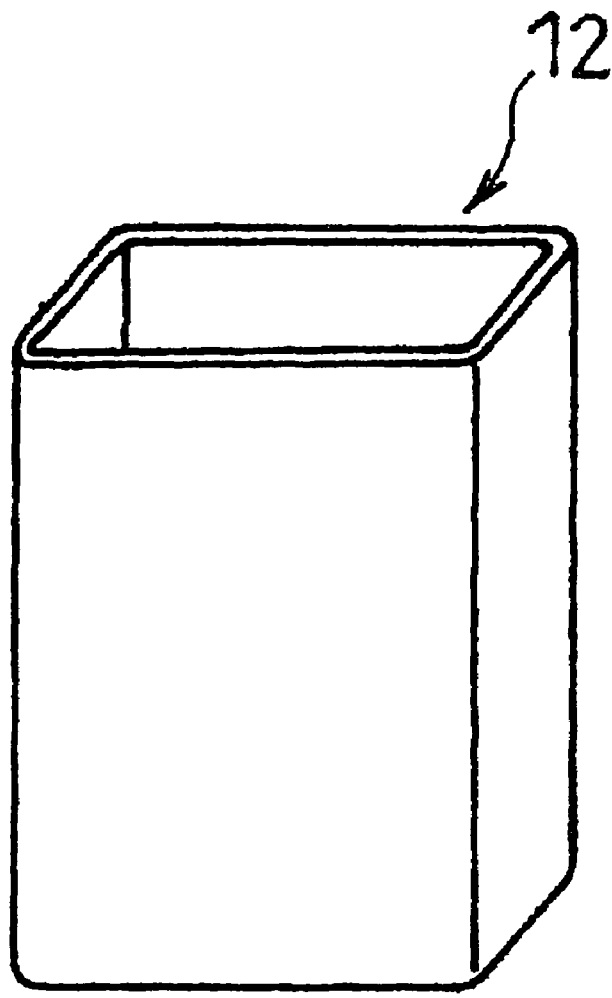
FIG. 3 An oblique view of a battery can with one end open and the other end closed having a rectangular cross section.
Figure 4:
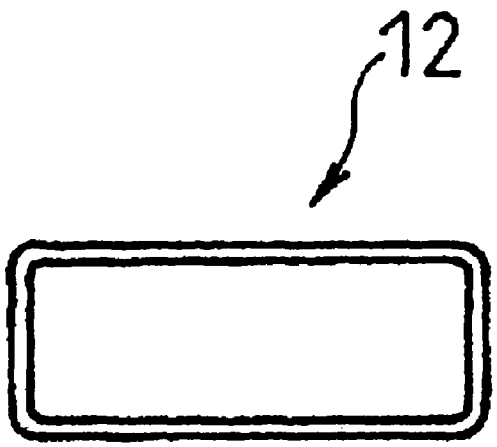
FIG. 4 A top view of the battery can with one end open and the other end closed having a rectangular cross section.
Figure 5:
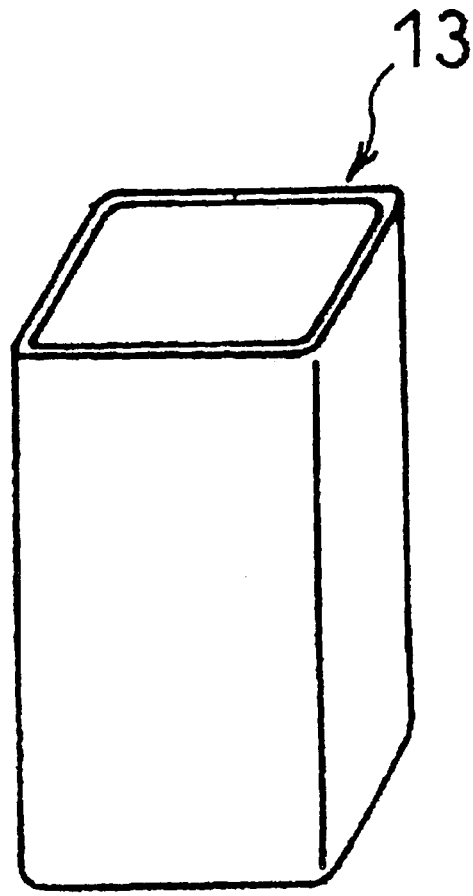
FIG. 5 An oblique view of a battery can with one end open and the other end closed having a square cross section with rounded corners.
Figure 6:
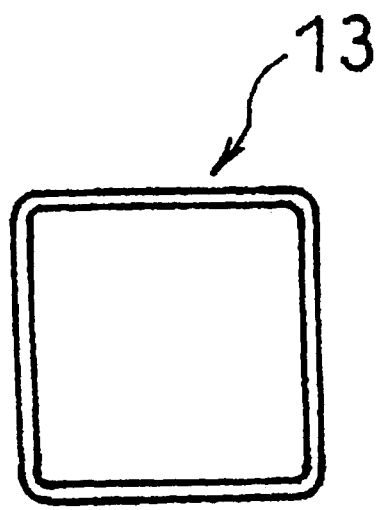
FIG. 6 A top view of the battery can with one end open and the other end closed having a square cross section with rounded corners.
Figure 7:
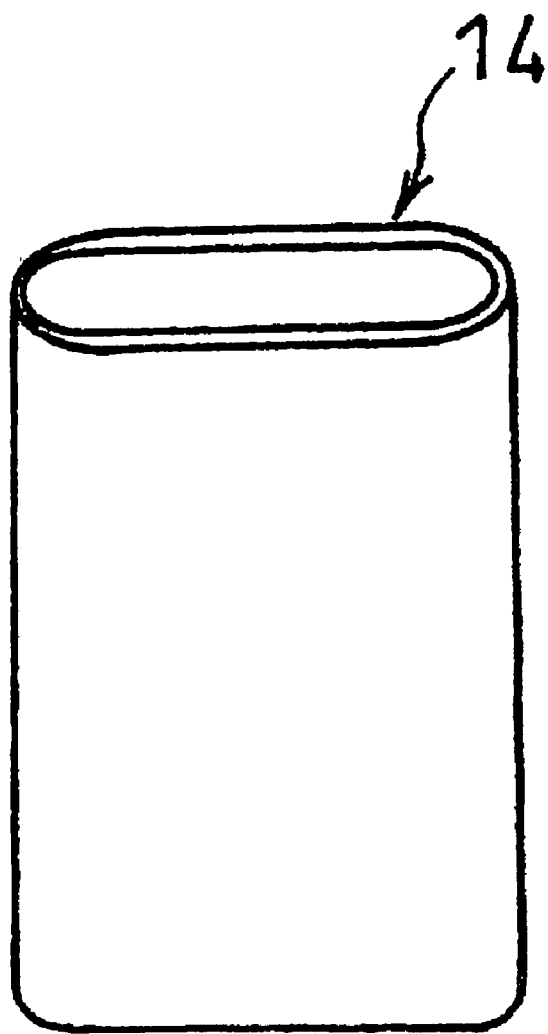
FIG. 7 An oblique view of a battery can with one end open and the other end closed having an oval cross section.
Figure 8:
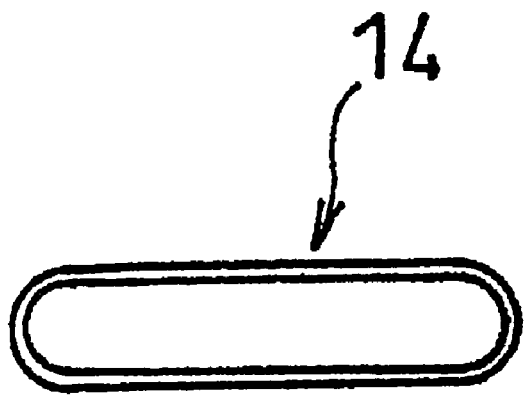
FIG. 8 A top view of the battery can with one end open and the other end closed having an oval cross section.

The present invention relates a battery can having an opening, comprising a cylindrical side portion and a bottom portion, and includes, for example, battery cans of any shape as shown in FIGS. 1 to 8. FIG. 1 shows an oblique view of the cylindrical battery can 11 having a circular cross section, and FIG. 2 is a top view thereof. FIGS. 3, 5 and 7 show battery cans 12, 13 and 14 with one end open and the other end closed each having a cross section of rectangle, square with rounded corners or oval. FIGS. 4, 6 and 8 show a top view thereof. These will merely serve as listed examples of the battery can of the present invention, and the present invention is not limited to these. The shape of the battery can may be, for example, of a cross section of rectangle with rounded corners, ellipse, polygon or the like. The bottom portion of the battery can may be flat or include a projected portion also serving as a terminal of either one of a positive electrode or a negative electrode.

The battery can of the present invention is formed from a steel plate having an Ni—Fe alloy layer on the face that will be the inner face of the battery can. The steel plate has a feature in that the Ni—Fe alloy layer has a 10 to 50 nm thick oxide layer containing iron on the surface thereof.

The oxide layer containing iron is excellent in electrical conductivity, compared with nickel oxide. Because of this, the contact resistance of the inner face of the battery can is reduced, compared with that of the conventional battery can having an Ni layer formed on the inner face thereof, thus permitting a favorable contact state with the electrode to be maintained. In order to maintain a favorable contact state with the electrode, the oxide layer preferably contains not less than 3 atm % of iron in the outermost surface thereof. However, the iron content in the outermost surface of the oxide layer exceeds 50 atm %, the corrosion resistance is reduced.

Therefore, the inner face of the battery can of the present invention have a stabler and more favorable contact resistance than that of the conventional battery can. In other words, the battery can is capable of ensuring a stable and favorable contact state with the electrode.

When the thickness of the oxide layer containing iron is less than 10 nm, the effect due to the oxide layer as described above is insufficient. On the other hand, the thickness of the oxide layer containing iron exceeds 50 nm, the oxide layer is readily peeled off.

Herein, the oxide layer containing iron refers to a section from the surface of the Ni—Fe alloy layer on the inner face of the battery can to an arbitrary depth below, in which not less than 5 atm % of oxygen is included. This oxygen concentration indicates a proportion of oxygen atoms to the total of iron atoms, nickel atoms and oxygen atoms.

The thickness of the oxide layer may be determined, for example, by means of element analysis in the direction of depth by X-ray photoelectron spectroscopy (XPS or ESCA). Specifically, for example, while a face etching is progressed in a limited area, the element analysis is performed at a predetermined depth to measure a concentration of oxygen (proportion of oxygen atoms). The depth measured from the surface to the point at which the proportion of oxygen atoms reaches 5 atm % is referred to as the thickness of the oxide layer. In ESCA, for example, ESCA 5100 manufactured by PerkinElmer is used.

Figure 9:
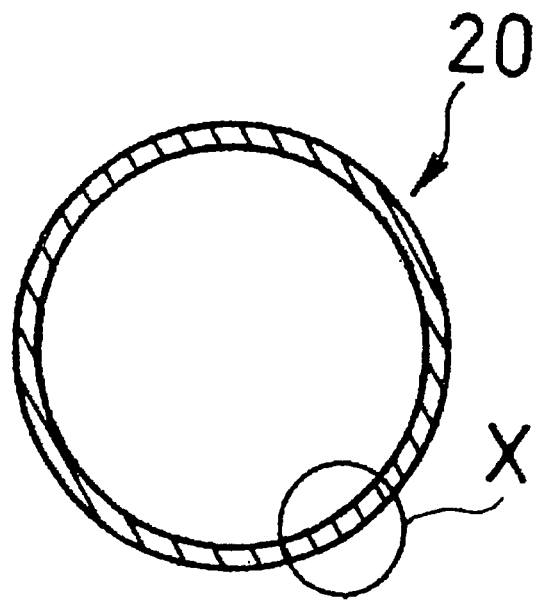
FIG. 9 A cross sectional view of an example of a battery can of the present invention.
Figure 10:
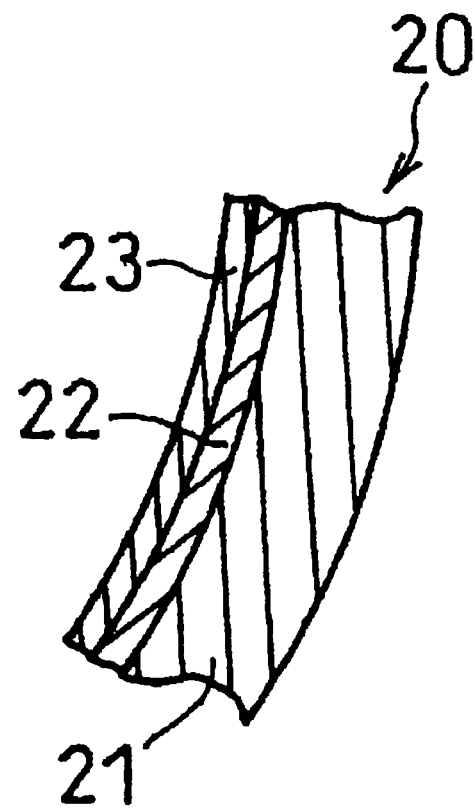
FIG. 10A An enlarged view of portion X in FIG. 9.
FIG. 10B An enlarged view of portion X in FIG. 9 having a Ni layer.
Figure 10A:
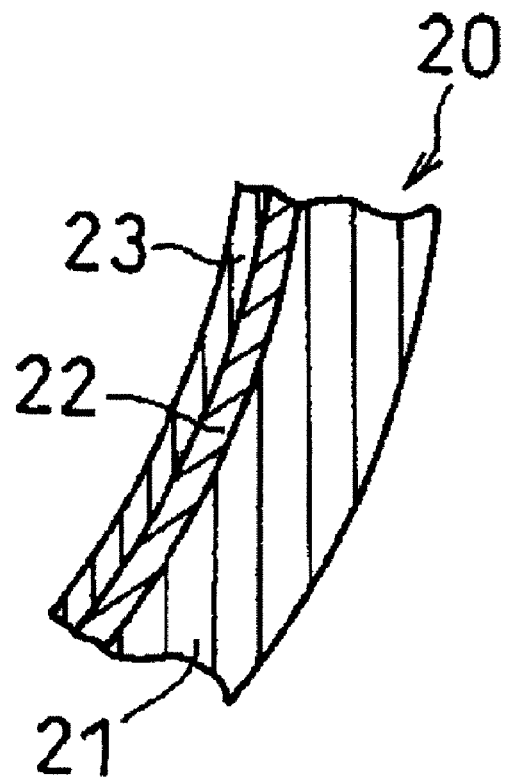

A cross sectional view of the cylindrical battery can 20 formed from the steel plate 21, which is an embodiment of the present invention, is shown in FIG. 9 and an enlarged view of portion X in FIG. 9 is shown in FIG. 10A.

The battery can 20 is formed from the steel plate 21 having the Ni—Fe alloy layer 22 on the inner face thereof as shown in FIGS. 9 and 10A, and further includes the 10 to 50 nm thick oxide layer 23 containing iron on the surface of the Ni—Fe alloy layer 22.

In FIGS. 9 and 10A, the thickness of the Ni—Fe alloy layer 22 is not particularly limited, but preferably 0.5 to 3.0 μm. By forming the Ni—Fe alloy layer 22 through heat treatment after nickel plating is applied, the processing follow-up property of the nickel layer and the steel plate made of iron at the time of can manufacturing is improved, and thus the occurrence of pin holes in the nickel layer after the can manufacturing is prevented. When the thickness of the alloy layer is less than 0.5 μm, the processing follow-up property is insufficient. When the thickness of the alloy layer exceeds 3.0 μm, the life of molding dies is shortened.

The surface roughness (arithmetic mean roughness: Ra) of the inner face of the battery can 20 is preferably not more than 1 μm. By adjusting the surface roughness (Ra) to not more than 1 μm through ironing as described below, a better homogenization of the oxide layer 23 is obtained and thus a favorable contact between the electrode and the oxide layer is sufficiently ensured.

Figure 10B:
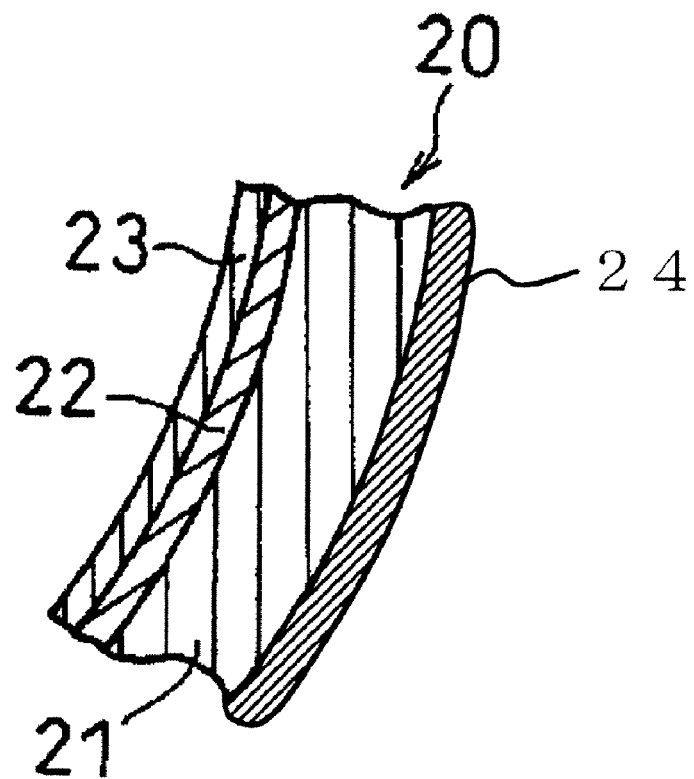

As shown FIG. 10B, the battery can 20 is preferably provided with an Ni layer 24 having a thickness of not less than 0.5 μm on the outer face thereof. The stress applied to molding dies at the time of can manufacturing is greater in the direction of outer face of the can than in the direction of inner face of the can, and the hardness of the steel plate 21 is higher than that of the Ni layer. For this reason, the life of molding dies will be significantly extended by additionally providing the Ni layer 24 on the surface of the steel plate, compared with the case where the steel plate 21 is left exposed. When the thickness of the Ni layer is less than 0.5 μm, it is difficult to cover the alloy layer without deficiency. In addition, it is preferable that the thickness of the Ni layer is usually up to approximately 2.0 μm, because an extremely thick Ni layer will increase the material cost. It is to be noted that the Ni—Fe alloy layer may be formed also on the outer face of the battery can, and the above-described Ni layer is formed on the Ni—Fe alloy layer.

In order to improve the strength of the battery can, prevent the swelling of the battery can due to an increase in internal pressure of the battery, and maintain a favorable contact state with the electrode, it is effective to allow the steel plate 21 to contain manganese and phosphorus. In this case, the manganese content in the steel plate is preferably 0.10 to 0.45 wt % and the phosphorus content in the steel plate is preferably 0.005 to 0.05 wt %. When the manganese content in the steel plate exceeds 0.45 wt % or the phosphorus content in the steel plate exceeds 0.05 wt %, the steel plate is hardened, the processability at the time of can manufacturing is reduced. On the other hand, when the manganese content in the steel plate is less than 0.1 wt % or the phosphorus content in the steel plate is less than 0.005 wt %, a sufficient strength of the battery can may not be obtained.

Next, a method for manufacturing the battery can of the present invention will be described.

First, a steel plate is prepared, and nickel plating is applied at least on the face that will be the inner face of the battery can, thereby to yield a steel plate having a nickel layer (a first step). The steel plate having a nickel layer is then heated to yield a steel plate having an Ni—Fe alloy layer whose thickness is 2.25 times as much as that of the nickel layer (a second step). Through the second step, iron atoms are allowed to diffuse up to the outermost surface of the nickel layer, whereby the Ni—Fe alloy layer is formed. This heat treatment is preferably carried out an inert atmosphere or a reducing atmosphere. The thickness of the Ni—Fe alloy layer is controllable by appropriate setting of the requirements for heat treatment including temperature and time.

In view of the heat treatment after nickel plating, a cold rolled steel plate of an unannealed or annealed ultra-low carbon steel plate for deep-drawing is preferably used for the steel plate to be subjected to nickel plating. The cold rolled steel plate is, for example, mainly composed of Fe and contains a small amount of element such as C, Si, Mn, S, P, Al or N.

Further, although various combination of the heat treatment temperature and heat treatment time in the above-described second step are possible, in the case where a ultra-low carbon steel plate is used, a heat treatment at 750 to 850° C. for 60 to 180 seconds using a continuous annealing furnace is preferred. With such requirements for heat treatment, even when an unannealed cold rolled steel plate is used, an Ni—Fe alloy layer is formed on the surface of the steel plate simultaneously with recrystallization of the base steel due to annealing. Moreover, a heat treatment time of 90 to 150 seconds is particularly preferred.

When the heat treatment temperature is not less than 750° C., heat treatment is completed for such a relatively short time as 60 to 180 seconds. When the heat treatment temperature is not more than 850° C., the diffusing speed of nickel into the iron layer (steel plate) is relatively slow. For this reason, the thickness of the Ni—Fe alloy layer is readily controllable by adjusting the heat treatment time. In other words, it is possible to readily prevent excessive diffusion of nickel atoms into the iron layer, and thus to prevent the Ni—Fe alloy layer from growing too thick.

Next, on the surface of the Ni—Fe alloy layer, an oxide layer containing iron and not less than 5 atm % of oxygen is formed, the oxygen being contained in a section from the surface thereof to an arbitrary depth below (a third step). The oxide layer is obtained, for example, by continuous annealing of the steel plate having an Ni—Fe alloy layer. The oxide layer of the present invention can be formed by appropriate setting of the atmosphere in the continuous annealing furnace. For example, the dew point or the internal pressure of protective gas in the furnace is to be controlled. It is preferable to control the dew point in view of operation.

Specifically, by setting the dew point in the quenching furnace (temperature range of 80 to 450° C.) in the continuous annealing furnace at 5 to 15° C., the thickness of the above-described oxide layer can be controlled within the range of 10 to 50 nm.

When the dew point exceeds 15° C., the oxide layer becomes too thick. This readily causes the phenomenon of so-called temper color or bluing on the base steel, by which the color of the surface thereof changes to brown or blue. When the dew point is less than 5° C., the thickness of the oxide layer is difficult to control. In the case of normal continuous annealing of cold rolled steel plate, the dew point of the annealing furnace is set at −20 to −30° C.; however, the thickness of the oxide layer can be controlled by increasing the dew point of the slow annealing furnace.

It is to be noted that in order to form a homogeneous oxide layer in a well-controlled manner in the third step, it is important that any oxide layer be not formed on the steel plate in the first step and the second step. It is particularly important that the heat treatment in the above-described second step be performed under an inert atmosphere or a reducing atmosphere.

The method for forming the oxide layer may be any method other than that as described above, and not particularly limited. The method includes, for example, a method of heating under an oxidizing atmosphere such as oxygen or air, and a method of spraying water and then allowing to stand under an oxidizing atmosphere. Alternatively, an oxidant may be applied on the Ni—Fe alloy layer.

The thickness of the oxide layer containing iron of 10 to 50 nm is appropriate. Therefore, after the formation of an oxide layer, in order to prevent the oxide layer from becoming thicker through natural oxidation, it is preferable that the surface of the oxide layer is thinly coated with mineral oil, or the like. It is to be noted that in the case where an oxidant is used for forming the oxide layer, the surface of the oxide layer may be thinly coated with mineral oil after the oxidant having been applied is removed by washing and drying, etc.

In addition, besides the above, packaging with a packaging material containing an antirust component, dehydrating with silica gel, or deoxidizing with an oxygen absorbent may be performed.

Further, the oxide layer containing iron may be an iron oxide layer or a composite oxide layer of iron and nickel. Alternatively, it may be a composite oxide layer containing other elements (for example, elements contained in the steel plate) in addition to iron and nickel.

Next, the steel plate is formed so that the face on which the oxide layer is formed is positioned inside and the thickness of the oxide layer is 10 to 50 nm, whereby a battery can having an opening, comprising a cylindrical portion and a bottom portion is obtained (a fourth step). Specifically, the battery can of the present invention is obtained by drawing and ironing (DI processing).

It is to be noted that in the forth step, since the thicknesses of the layers formed on the inner face by ironing such as the oxide layer, the Ni—Fe alloy layer and the like are slightly reduced, the ironing rate (%) (=(steel plate thicknes−battery can thickness)/steel plate thickness×100) needs to be adjusted so that the thickness of the oxide layer covering the inner face of the battery can is 10 to 50 nm.

In a battery using the battery can of the present invention, since the battery can is capable of maintaining a stable and favorable contact state with the electrode as described above, an excellent high rate discharge characteristics is obtained. Moreover, since the oxide layer is formed homogeneously, variations in the contact resistance with the electrode are reduced, and thus variations in the battery performance including the discharge characteristics are prevented.

The battery can of the present invention can be used as a battery can with high quality to serve as an outer case for manganese batteries, alkaline manganese batteries, nickel-cadmium storage batteries, nickel-metal hydride storage batteries, non-aqueous electrolyte secondary batteries represented by lithium ion batteries, and the like.

EXAMPLE

Example of the present invention will be hereinafter described in detail. An alkaline dry battery is taken as one Example of the battery can of the present invention and the description thereof will be made in the following.

(1) Fabrication of a Battery Can

As a base material of the battery can, hoop-shaped cold rolled steel plates of 0.4 mm in thickness containing impurities and Fe as a main component, and additionally containing 0.001 wt % of C, 0.01 wt % of Si, 0.24 wt % of Mn, 0.009 wt % of S, 0.001 wt % of P, 0.043 wt % of Al, and 0.0023 wt % of N were prepared. And electrolytic Ni plating was applied onto one face of each cold rolled steel plate. The requirements for Ni plating are shown in Table 1. In each steel plate after Ni plating, the thickness of the Ni layer was 1.5 μm.

TABLE 1

| Item | Requirements | |
|---|---|---|
| Bath composition | Nickel sulfate | 250 g/L |
| | Nickel chloride | 45 g/L |
| | Boric acid | 30 g/L |
| Bath temperature | | 50° C. |
| Current density | | 0.1 A/cm$^2$ |
| pH | | 4.3 |

The steel plate after Ni plating was guided into a continuous annealing furnace and then heated at 780° C. for two minutes under circulation of nitrogen including approximately 1% of hydrogen gas (i.e., under a reducing atmosphere). As a result of heat treatment, an Ni—Fe alloy layer was formed on one face of each steel plate. The thickness of the Ni—Fe alloy layer was approximately 2.6 μm.

Then the steel plate was then subjected to continuous annealing in the rapid cooling oven in the continuous annealing furnace at temperatures in the range of 80 to 450° C. and dew points in the range of 5 to 15° C., whereby an oxide layer was formed on the Ni—Fe alloy layer.

A circular piece was punched out of the steel plate after heat treatment to give a cup-shaped intermediate product. Subsequently, the cup-shaped intermediate product was formed into a cylindrical shape by the DI method consisting of drawing and ironing performed in one continuous stroke using two drawing dies and three ironing dies, respectively, and then the edge thereof was cut away to produce a battery can. Herein, the center of the bottom portion of the battery can was provided with a projection that protruded to the outside of the battery can and also serves as a terminal.

The battery can thus obtained was of a cylindrical shape having an outer diameter of 14.5 mm and a height of 50 mm (the height including the projection). The thickness of the bottom portion of the battery can was approximately 0.4 mm and the thickness of the side portion was 0.2 mm. In other words, the thickness of the side portion of the battery can was reduced to half, compared with the initial thickness. It is considered accordingly that the thickness of the Ni—Fe alloy layer on the side portion of the battery can was reduced at the same rate.

(2) Fabrication of a Positive Electrode Material Mixture

Manganese dioxide and graphite were mixed at a weight ratio of 90:10. The mixture thus obtained and a 40 wt % aqueous potassium hydroxide solution as an alkaline electrolyte were mixed at a weight ratio of 100:3, subsequently stirred sufficiently, and then compressed and formed into flakes. Then, the flakes of positive electrode material mixture was pulverized to be granular, and then classified with a sieve to obtain a material having a mesh size of 10 to 100. This material was pressed and molded into a hollow cylindrical shape to give a pellet of positive electrode material mixture.

(3) Fabrication of a Gelled Negative Electrode

Sodium polyacrylate as a gelling agent, a 40 wt % aqueous potassium hydroxide solution as an alkaline electrolyte and a zinc powder as a negative electrode active material were mixed at a weight ratio of 1:33:66 to yield a gelled negative electrode.

(4) Assembling of a Cylindrical Alkaline Dry Battery

Figure 11:
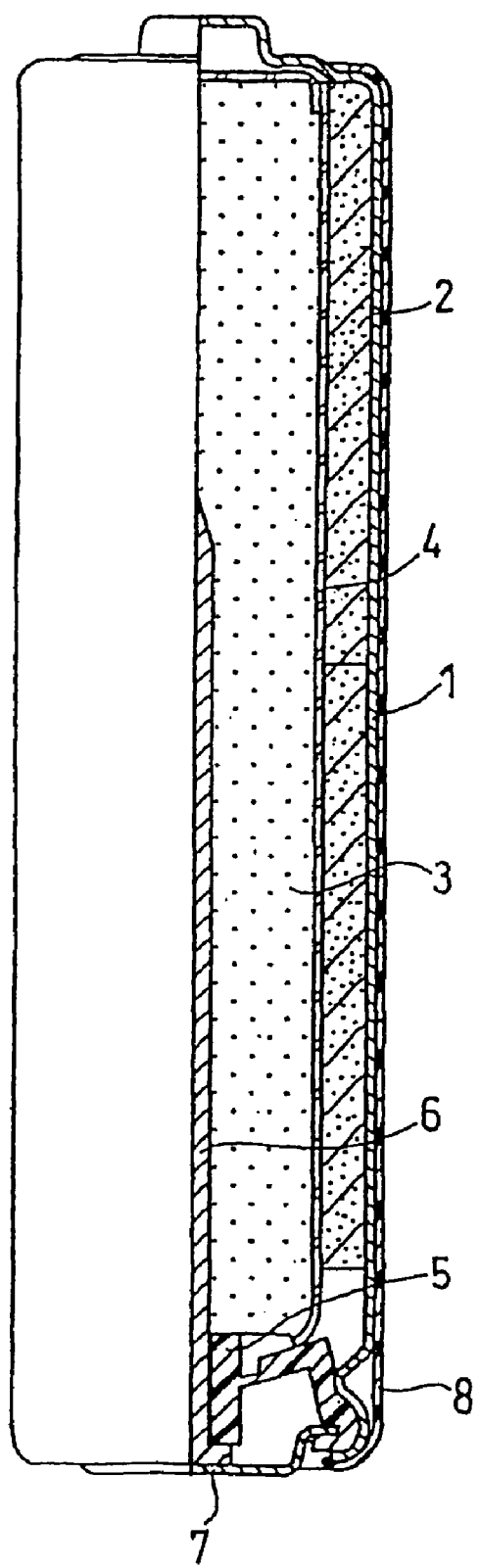
FIG. 11 A front view of an alkaline dry battery using the battery can of the present invention, with a portion shown in cross section.

An AA size alkaline dry battery (LR6) structured as shown in FIG. 11 was fabricated in the manner as described below. FIG. 11 is a front view of a cylindrical alkaline dry battery, with a portion shown in cross section.

Two pellets of positive electrode material mixture 2 obtained in the foregoing manner were inserted into the battery can 1. The positive electrode material mixture 2 was then remolded with a pressing jig so as to be brought into close contact with the inner wall of the battery can 1. The cylindrical separator 4 with closed bottom was placed in the hollow of the center of the positive electrode material mixture 2 being in close contact with the inner wall of the battery can 1. Into the separator 4, a predetermined amount of 40 wt % aqueous potassium hydroxide solution was injected as an alkaline electrolyte. After the passage of a predetermined time, the gelled negative electrode 3 obtained in the foregoing manner was charged into the separator 4. Herein, as the separator 4, nonwoven fabric mainly composed of polyvinyl alcohol fibers and rayon fibers that are woven together was used.

The negative electrode current collector 6 was inserted into the center of the gelled negative electrode 3. Herein, prior to this insertion, the negative electrode current collector 6 was combined with the sealing body 5 and the bottom plate 7 also serving as a negative electrode terminal. After the insertion, the opening end of the battery can 1 was caulked onto the periphery of the bottom plate 7 via the end portion of the sealing body 5, to seal the opening of the battery can 1. The outer surface of the battery can 1 was covered with the outer label 8.

In the above-described fabrication of the battery can, various battery cans different in the thickness of the oxide layer were fabricated by adjusting the temperature and the dew point of the rapid cooling oven in the foregoing manner while giving consideration to the variation in thickness of the steel plate at the time of DI processing. These battery cans were used to fabricate alkaline dry batteries in the manner as described above.

[Evaluation]

(A) Measurement of the Thickness of the Oxide Layer Containing Iron on the Inner Surface of the Battery Can Each battery can was subjected to element analysis in the direction of depth by X-ray photoelectron spectroscopy (XPS or ESCA). The depth measured from the surface to the point at which the proportion of oxygen atoms reached 5 atm % was referred to as the thickness of the oxide layer. In ESCA, ESCA 5100 manufactured by PerkinElmer was used.

(B) Pulse Discharge Test

Each battery was subjected to a pulse discharge (end voltage: 0.9 V) in which a three second discharge at a constant power of 1000 mW and a seven second pause were alternately performed, whereby a discharge time was measured. The measurement results are shown in Table 2. Herein, the discharge time in Table 2 is a total discharge time until the discharge voltage reached 0.9 V.

TABLE 2

| Thickness of oxide layer containing ion (nm) | Iron content in outermost surface of oxide layer (atm %) | Pulse discharge time (min) |
|---|---|---|
| 8.0 | 0 | 74.6 |
| 11.0 | 3.9 | 78.9 |
| 13.8 | 6.5 | 79.3 |
| 25.9 | 16.9 | 79.8 |
| 37.6 | 25.5 | 80.3 |

The results of Table 2 indicated that when the thickness of the oxide layer containing iron was not less than 10 nm, an excellent pulse discharge performance was obtained. Moreover, in the above described process of fabricating a battery can, when the thickness of the oxide layer exceeds 50.0 nm, it was observed that the oxide layer was peeled off.

INDUSTRIAL APPLICABILITY

The battery can of the present invention can be preferably used as an outer case for manganese batteries, alkaline manganese batteries, nickel-cadmium storage batteries, nickel-hydrogen storage batteries, non-aqueous electrolyte secondary batteries represented by lithium ion batteries, and the like.

The invention claimed is:

1. A battery can having an opening, comprising a cylindrical side portion having an inner face and an outer face; and a bottom portion, wherein:
    said battery can is formed from a steel plate,
    said inner face has thereon a Ni—Fe alloy layer, and
    said Ni—Fe alloy layer further has thereon an oxide layer containing oxide, nickel, and iron and having a thickness of 10 to 50 nm.

2. The battery can in accordance with claim 1, wherein said oxide layer contains in an outermost surface thereof, 3 to 50 atm % of iron.

3. The battery can in accordance with claim 1, wherein the thickness of said oxide layer is a depth from an outermost surface thereof to a point where an oxygen concentration reaches less than 5 atm % in element analysis in the direction of depth by X-ray photoelectron spectroscopy.

4. The battery can in accordance with claim 1, wherein the surface roughness (Ra) of said oxide layer is not more than 1 μm.

5. The battery can in accordance with claim 1, wherein said outer face has thereon a Ni layer having a thickness of not less than 0.5 μm and not more than 2.0 μm.

6. The battery can in accordance with claim 1, wherein said steel plate contains 0.10 to 0.45 wt % of manganese and 0.005 to 0.05 wt % of phosphorus.

* * * * *